United States Patent [19]

Ver Nooy

[11] 4,411,459
[45] Oct. 25, 1983

[54] BRANCH FITTING FOR PROVIDING ACCESS TO THE INTERIOR OF A PIPE

[75] Inventor: Burton Ver Nooy, Tulsa, Okla.
[73] Assignee: T. D. Williamson, Inc., Tulsa, Okla.
[21] Appl. No.: 278,642
[22] Filed: Jun. 29, 1981
[51] Int. Cl.³ .................. F16L 41/06; F16L 55/10; F16L 55/18
[52] U.S. Cl. ................................. 285/197; 285/15; 137/15; 137/318
[58] Field of Search ............... 285/15, 197; 137/315, 137/318, 15; 29/157 T, 157.1 R

[56] References Cited
U.S. PATENT DOCUMENTS

| | | | |
|---|---|---|---|
| 2,608,989 | 9/1952 | McDonald | 137/318 |
| 3,692,044 | 9/1972 | Wise | 137/318 |
| 3,981,322 | 9/1976 | Gebelius | 137/318 |
| 4,034,777 | 7/1977 | Gebelius | 137/318 |
| 4,067,353 | 1/1978 | DeHoff | 137/318 |

Primary Examiner—Richard J. Scanlan, Jr.
Attorney, Agent, or Firm—Head, Johnson & Stevenson

[57] ABSTRACT

A branch fitting for providing access to the interior of a pipe, the fitting having first and second body portions each having a semi-cylindrical surface adapted to sealably engage the pipe, the body portions being secured together and to the pipe in a pressure retaining relationship, one body portion having a first and second integral cylindrical barrel portion extending in the plane of the tubular axis of the pipe, the cylindrical axii of the barrel portions intersecting each other at a point at or adjacent the pipe wall, a cutter within one of the barrel portions having a shaft extending sealably exteriorly of the barrel portion whereby the cutter may be rotated and axially advanced to form an opening in the pipe, the opening being coincident with the cylindrical axis of the second barrel portion. The second barrel portion may contain a plugging member and means of delivering it into the interior of the pipe through the formed opening.

10 Claims, 3 Drawing Figures

BRANCH FITTING FOR PROVIDING ACCESS TO THE INTERIOR OF A PIPE

BACKGROUND OF THE INVENTION

1. Field of the Invention

This invention relates to a fitting for use in providing access to the interior of a pipe. The invention is particularly applicable to the field of art relating to apparatus for working on a pipeline having liquid or gas therein by providing means of securing access to the interior of the pipeline without the escape of such liquid or gas and without the necessity of first draining or depressurizing the pipeline. The invention is related to apparatus which can be secured to the exterior of a pipe and thereafter an opening formed in the pipe to provide a passageway through which a plugging device may be inserted into the interior of the pipe to close off the pipe against liquid or gas flow.

2. Description of the Prior Art

A known technique in the maintenance of pipelines is the use of apparatus for achieving communication with the interior of the pipeline without the necessity of draining it of liquids or gases. For this purpose it has been a known practice to provide tapping devices which may be secured to the outside of a pipeline. These tapping devices typically include a branch fitting welded or bolted to a pipeline. By means of a valving structure secured to the branch fitting, a tapping tool may be used to drill a hole in the line, thus providing communication between the interior of the line and the branch so that fluid flow may be continued through the branch.

While the apparatus of the prior art has worked satisfactorily to achieve the intended results, known techniques, particularly when it is necessary to close off a pipeline to prevent fluid or gases therein from escaping while repairs are conducted on the line, require apparatus in which a number of steps must be employed, including the use of a valving structure.

The reason that a sequence of a relatively large number of steps is necessary is that all of the present devices require both the hole forming operation and the plugging operation to be carried out along the same axial passageway. This means that equipment used for providing the opening in the pipeline must be withdrawn and replaced with the plugging equipment. This requires some type of valving function intermediate these steps. Otherwise the interior of the pipeline is exposed for the discharge of contents.

The present invention is directed towards a dual function fitting in which access is provided to the interior of a pipeline without exposing the contents of the pipeline for discharge to the environment and in which the operations of forming an opening in the pipeline are carried out in a separate compartment compared to the operations for plugging or other efforts in the pipeline. The present device provides a unique fitting for use on pipelines in which all of the apparatus required for forming an opening in a pipeline and for subsequently plugging the pipeline can be carried in a single structure in which no valving function is required between the step of drilling an opening in a pipeline and the step of plugging the pipeline by inerting a plugging member through the opening having been formed in the pipeline.

It is therefore an object of this invention to provide a new type of fitting for use in maintenance and repair of pipelines.

More particularly, an object of this invention is to provide a dual branch fitting for use on a pipeline in which, after the fitting is attached to the exterior of a pipeline, an opening may be formed in the pipeline, by means in one branch of the fitting and subsequently, operations carried out within the pipeline through the formed opening by means extending from the other branch of the fitting.

These general objects as well as other and more specific objects and advantages of the invention will be set out in greater detail in conjunction with the attached drawings.

For an indication of the state of the art as to other similar devices relating to the subject matter of this invention, reference may be had to the following United States patents:

Myll U.S. Pat. No. 3,156,490, Minchhoff U.S. Pat. No. 3,756,261, Witter U.S. Pat. No. 4,015,321, Freeman U.S. Pat. No. 4,054,978, DeHoff U.S. Pat. No. 4,067,353, Bills U.S. Pat. No. 4,103,940, and Sakamoto et al. U.S. Pat. No. 4,243,217.

SUMMARY OF THE INVENTION

This invention is a branch fitting for providing access to the interior of a pipe. The fitting includes a first and a second body portion, each having a cylindrical surface adapted to sealably engage the pipe. The body portions are secured to the pipe and to each other, such as by bolting or welding, so that, as secured to the pipe, they provide a pressure retaining relationship with the pipe. One of the body portions has a first and a second integral cylindrical barrel portion extending from it. The cylindrical axis of each of the barrel portions is in the plane of the tubular axis of the pipe and cylindrical axis of each of the barrel portions intersect each other at a point at or adjacent the pipe wall. Carried in one of the barrel portions is a means of forming an opening in the pipe such as a tubular cutter having teeth at the forward end. The cutter has an axial shaft extending from the rearward end thereof and through an opening closing the rearward end of the cylindrical barrel, the opening being sealed against leakage. In the preferred arrangement, the external diameter of the cutter is equal to the internal diameter of the pipe. By means externally of the fitting the shaft is rotated and axially forwardly advanced to cut a hole in the pipe. The cutter ideally retains and captures the coupon formed by the cutting operation. After the hole is cut the cutter can be withdrawn fully back into the first barrel portion, thereby leaving a hole in the pipe providing communication with the second barrel portion. The hole is coincident with the cylindrical axis of both the first and second cylindrical barrel portions.

In one embodiment, a plugging member is encompassed in the second barrel portion including means extending sealably through the end wall of the second barrel by which the plugging means may be moved out of the second barrel portion and into the interior of the pipeline, passing through the opening formed by the cutting operation.

The invention thus improves over the prior art by providing an apparatus which is essentially self-contained at the time it is installed on a pipeline to first provide communication with the interior of the pipeline and second provide means of plugging the pipeline without the need for an intermediate operation or the use of ancillary equipment.

DESCRIPTION OF THE VIEWS

DESCRIPTION OF A PREFERRED EMBODIMENT

Figure 1:
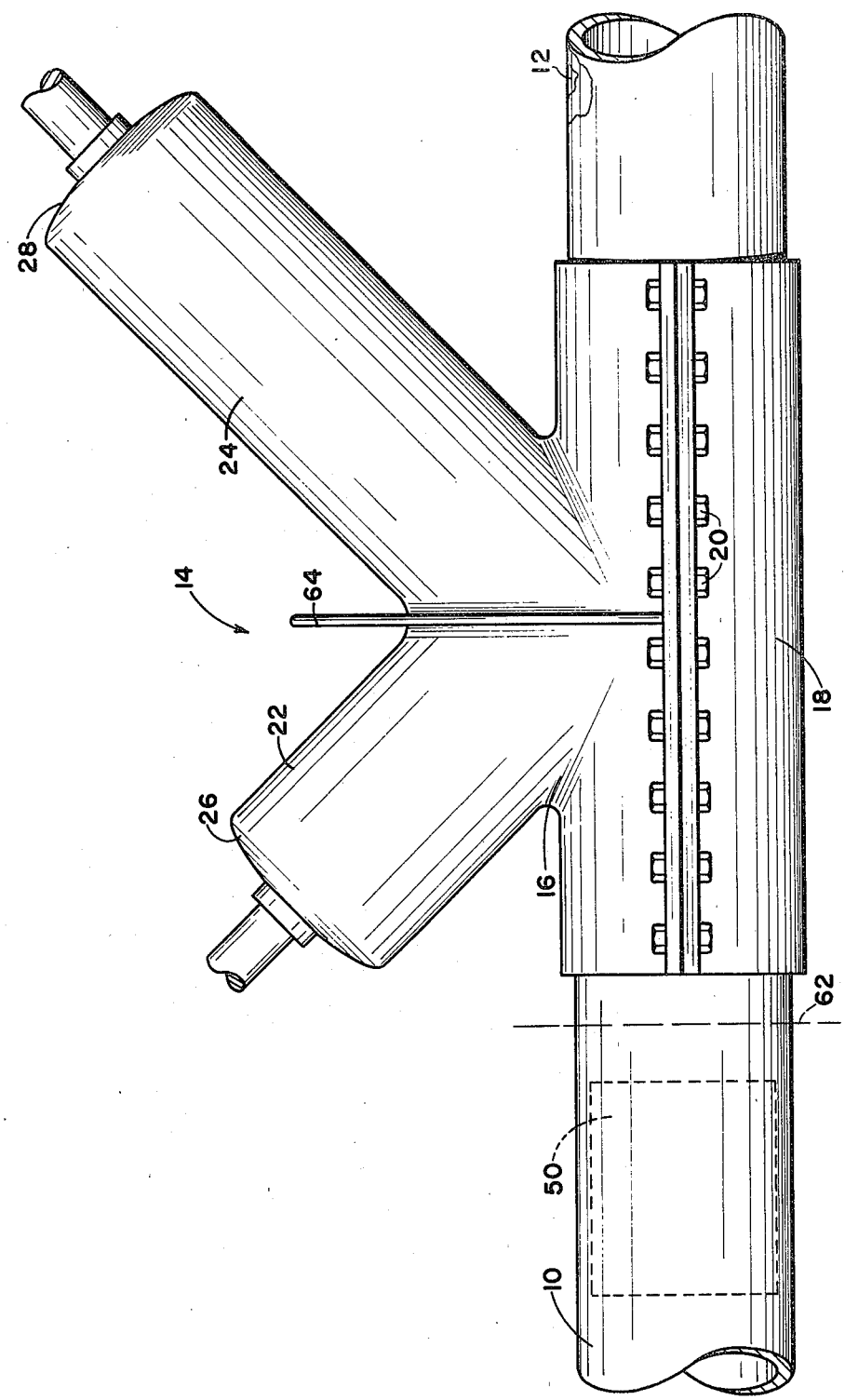
FIG. 1 is an elevational external view of a section of a pipeline showing one embodiment of the fitting of this invention affixed to the pipeline. The fitting can be employed to provide communication with the interior of the pipeline such as for use in inserting a plugging member into the pipeline.

Referring to the drawings, a section of a pipeline is indicated by the numeral 10. For purposes of illustrating one application of this invention, a damage, such as a hole allowing leakage of fluid or gas from the interior of the pipeline, is indicated at 12. The pipeline 10 may be buried in the ground or may be submersed in water such as pipelines carrying production from offshore locations. A typical problem encountered in the industry is to remove the damaged portion of the pipeline without allowing the contents of the pipeline, whether liquids or gas, to be discharged during the repair operation. Solving this problem is an example of one application of the invention, but as will be described in more detail subsequently, such use is not exhaustive of the applications of the invention in the pipeline industry.

To enable a section of pipe including the damaged portion 12 to be removed, the interior of the pipeline to either side of the damaged portion 12 must be closed off by a leakproof means. For this purpose a branch fitting generally indicated by the numeral 14 which incorporates the novel principles of this invention is employed. The branch fitting 14 includes a first body portion 16 and a second body portion 18. As shown in the cross-sectional views of FIGS. 2 and 3, each of the body portions 16 and 18 include semi-circular interior surfaces 16A and 18A which conform to the exterior of pipe 10. The body portions 16 and 18 are secured to the pipe 10 such as by the means of bolts 20 which are attached to integral extending flange portions on each side of the body portions. Another arrangement includes the provision of a hinge on one side (not shown) with bolts on the other side to bolt the two halves together about the pipe. A third arrangement is that of welding the two body portions to each other and to the pipe to provide a leakproof relationship. Where the portions are bolted together, it may be desirable to include adjacent each interior end, packing (not shown) to ensure the leakproof contact of the fitting with the pipe. The use of packing such as O-rings is well known in the industry for the application of fittings to pipelines and therefore is not illustrated herein.

The first body portion 16 includes a first integral cylindrical barrel portion 22 and a second integral cylindrical barrel portion 24. In the illustrated arrangement the barrel portion 22 is closed at its outer end with an integral, bellshaped closure 26, and in like manner, the second barrel portion 24 is closed by an integral end portion 28. It can be seen that instead of having integral end portions 26 and 28, the outer ends of each of the barrel portions 22 and 24 may be provided with flanges and that removable closure members may be affixed to the flanges.

Figure 3:
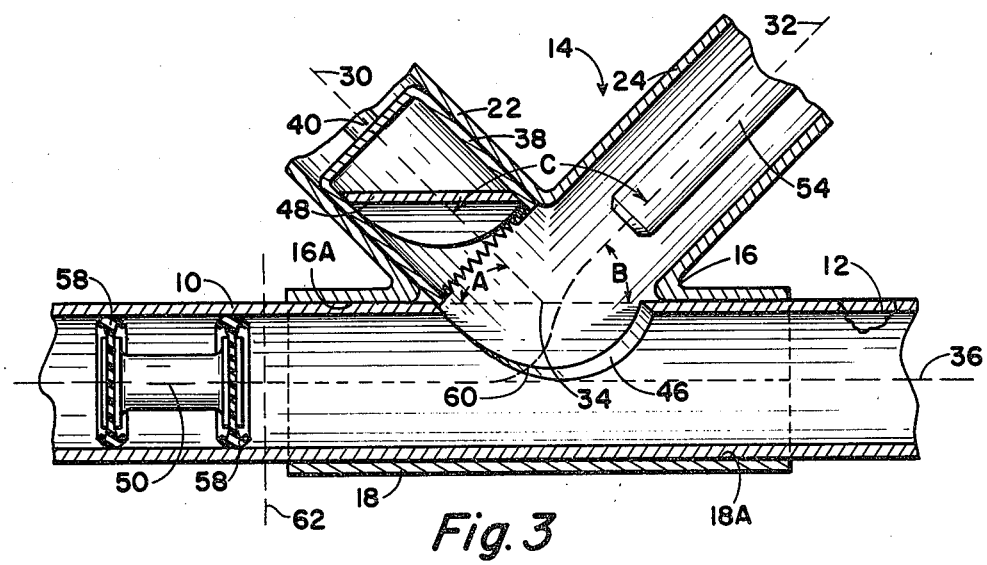
FIG. 3 is a cross-sectional elevational view as shown in FIG. 2 but showing the subsequent step employed in practicing the invention wherein a plugging member has been inserted into the pipeline for closing off the line.

FIG. 3 shows the cylindrical axis of the first barrel portion 22 by a dotted line 30 and the cylindrical axis of the second barrel portion 24 by the dotted line 32. The axii of the barrel portions 22, 24 intersect at a point 34 which is preferably at the surface of pipeline 10. It can be seen that the point 34 may be slightly above or slightly below the external surface, but as will be understood from the following description, this point of intersection 34 must be in the close proximity of the wall of pipe 10. The axii 30 and 32 are in a common plane with the longitudinal tubular axis 36 of pipe 10.

The axis 30 of the first barrel portion 22 intersects the wall of pipe 10 at an angle A. This angle A is the same angle of intersection of axis 30 with the pipe axis 36. The axis 32 of second barrel portion 24 intersects the pipe wall at an angle B which is also the angle of intersection of axis 32 with pipe tubular axis 36. The angle between axis 30 and axis 32 is indicated by C. In the illustrated arrangement of the figures, angle A and angle B are about 45° and angle C 90°. These angles may vary considerably. For instance, angle A may be between 30° and 90°. Angle A does not need to be the same as Angle B. Angle C should be between 30° and 120°.

Retained within the first barrel portion 22 is a means of cutting or forming an opening in pipe 10. In the illustrated arrangements of FIGS. 2 and 3, this cutting means is in the form of a tubular circular saw 38 having teeth 38A on the forward end thereof. Means must be provided extending exteriorly of the barrel portion 22 for actuation of the cutting device. In the illustrated arrangement, the circular saw 38 has a coaxial shaft 40 which extends through an opening 42 in the first barrel portion end wall 28. To prevent leakage along shaft 40, seal 44 is employed. Before and during the attachment of the fitting to pipeline 10, the circular saw 38 is withdrawn completely within the barrel portion 22. After the fitting is secured to the pipe 10, the shaft 40 may be rotated and axially advanced by means externally of the fitting to saw an opening 46 in pipeline 10. After the opening is completed, circular saw 38 is withdrawn, retaining within it a coupon 48 cut from the pipe to form opening 46. After this step is completed, the interior of the pipe 10 is fully exposed to the second barrel portion 24. If all that is required is the provision of fluid communication with the interior of the pipeline, such may be obtained through the second barrel portion 24 without further action. However, the invention is particularly useful in providing other applications for the maintenance and repair of pipelines.

Figure 2:
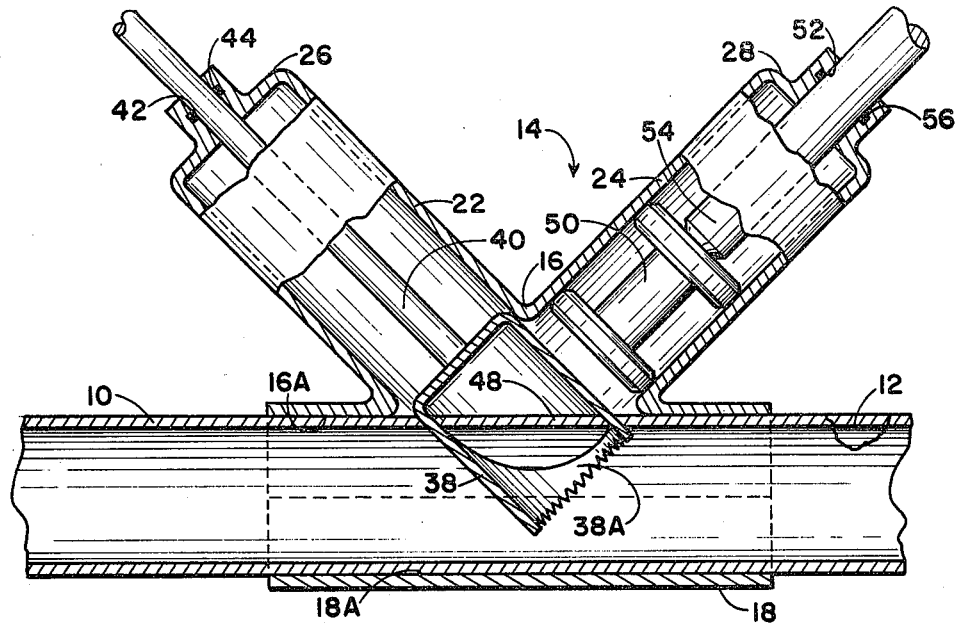
FIG. 2 is an elevational view as shown in FIG. 1 but showing the apparatus in cross-section and showing the cutter having been advanced to cut a hole in the wall of the pipeline and showing a plugging member in position within the fitting ready to be inserted into the pipeline.

To illustrate the further application of the invention, FIG. 2 shows disposed within the second barrel portion 24 a plugging member 50. The exact configuration of the plugging member 50 may vary considerably as many types of plugging devices are known and employed in the industry. As an example, rather than the spool-shaped plug 50, it may be a cylindrical member or it may be a spherical ball of resilient material. After the hole 46 is formed in the pipe 10, the plugging member 50 may be inserted through hole 46 into the interior of pipe 10. As illustration of one means whereby this is accomplished, the end closure 28 for the second barrel portion is provided with an opening 52 which slidably receives therein a rod 54. A seal 56 is provided in the opening to prevent leakage of liquids or gases. The rod 54 may be axially inwardly advanced to force plugging member 50 from within the confines of the second barrel portion 24 through the opening 46 and into the interior of the pipe 10 towards the position shown in FIG. 3. The plugging member 50 is equipped with circumferential elastomeric seals 58 so that when in position within the pipeline it closes the pipeline against leakage of liquids or gases.

The hole 46 formed by circular saw 38 is not symmetrical due to the angle A unless the angle A is 90°. However, when the angle A is 90° and the hole is symmetrical, the axis 32 of second cylindrical barrel portion 24 is inclined at an angle thereto. Thus, in all different orientations possible for the configuration of the fitting, some assymmetry of the hole with respect to the passage of pig 50 is to be encountered. For this purpose, the actual path of the plugging member may depart from an extension of the axis 32. The actual path of entry of the plugging member through hole 46 is indicated by the dotted line 60. When the circular saw 38 is of an exterior diameter substantially equal to the interior diameter of pipe 10, the width of the hole in a plane perpendicular the pipe tubular axis 36 equal to the diameter of the pipe will be displaced somewhat in the direction towards the end of the fitting having the second barrel portion 24 from the point 34 at which the axis 32 and 30 intersect. Thus, when a device having the full or substantially full diameter of the interior diameter of pipe 10 is inserted through opening 46, its path of travel will be approximately that indicated by the dotted line 60. The use of a rod 54 to eject the plugging member 50 from within the second barrel portion 24 through the opening 46 and into the interior of the pipe 10 is for illustrative purposes only. Obviously, this rod 54 may be a flexible member and a variety of other means may be employed for moving the plugging member or other element from within the second barrel portion 24 into the interior of the pipe.

Another embodiment, though not illustrated, but which is an obvious adaptation of the principles of this invention, includes the use of a pig or pig member 50 or plugging device which is inflatable or expandable so that as it passes through the opening 46 it has a diameter less than the internal diameter of the pipe and therefore may readily pass directly through the opening. Once within the interior of the pipe 10 and in the proper position, it could then be expanded to sealably close the interior of the pipe. This and other adaptations of the use of the unique fitting of this invention will suggest themselves to the practitioner in the art. While the use of a circular saw 38 is illustrated as a means of providing the opening 46 in pipe 10, other devices may be employed such as the use of shaped charge devices described in U.S. Pat. Nos. 3,503,407 and 3,599,663. Other types of boring devices, including the use of a typical bit having the diameter desired for hole 46, may be employed. Use of the circular saw 38 has the advantage that it produces a smaller amount of cutting and is capable, when properly configured, to capture the coupon 48 to thereby remove it from the pipe.

The drawings illustrate a dual-function branch fitting which embodies the concepts of the invention in a single form. Obviously, commercial applications of the invention may employ structures which are refined for engineering purposes and which may be visually dissimilar from the illustrated embodiment while at the same time encompassing the inventive concepts set forth herein. As an example of structural changes which can be made in the device, FIG. 1 illustrates an integral reinforcing rib 64 as a part of upper body portion 14, the rib not being shown in FIGS. 2 and 3. Obviously, many other types of reinforcing can be employed as necessary depending on the size and pressure rating of the fitting.

APPLICATION OF THE INVENTION

As was initially stated, the invention is to enable a defect indicated by the numeral 12 in pipe 10 to be repaired. For this purpose, the pipeline is depressurized but does not have to be drained. Two of the fittings illustrated herein are employed—one on each side of the damage 12. A fitting 14 is first secured to pipe 10, the hole 46 cut therein, and the pig member 50 inserted into the position as shown in FIGS. 1 and 3. This action is duplicated on a portion of the pipe on the other side of the defect 12. The pipeline is thereby sealably closed off in both directions from the defect 12. The pipeline 10 may then be cut such as at dotted lines 62 in FIGS. 1 and 3, and a similar cut placed beyond the similar fitting secured to the pipeline on the other side of the defect 12. This allows the portion of the pipeline including the defect 12 which also has attached to it the fittings 14 of this invention to be removed. After the removal of this damaged section, the pipeline can be repaired by welding into position a replacement short section of pipe. Plugging member 50 and its counterpart on the other side of damage 12 remain in the pipeline, however, once the pipeline is repaired, it may be repressured and the plugging members can then be forced to move by the liquid or gas flow through the pipeline in the usual manner in which pig members are employed. Since the fittings 14 are removed with the section of damaged pipe, they can be taken from the damaged pipe and are available for subsequent reuse as many times as desired.

The purpose of the two branches provided by barrel portions 22 and 24 of fitting 14 is to separate the functions of tapping the hole 46 into the wall of pipe 10 from the function of insertion of a pig member 50 through that hole into the pipe. The fitting enables this to be done in such a manner as to avoid the dismantling of one set of equipment and the assembling of another therebetween. This is particularly important in underwater operations, in emergency procedures, and in any other case where a fast operation is both economical and safer to utilize. Further, the elimination of a series of joints and the motions required to make and break these joints results in a safer operation with much less chance of leakage. The length of the barrel portions 22 and 24 are minimized by the elimination of tapping valves, separate adaptors, and completion plug mechanisms.

Rather than the insertion of a plugging member 50 for closing off the pipeline, pig members having other applications may be utilized. In such cases the members 50 may be equipped with seals for propulsion and/or fluid separation, with discs or disc segments or blades to scrape material from the pipe wall, including the uses of brushes to dislodge deposits from the pipe, or the pig member may include instrumentation to gather information from an operating pipeline. Another application includes the use of pigs 50 for internally coating or repairing the coatings of the pipeline. An obvious extension of the application of the fitting of this invention, in addition to the ability to insert a pig member into the pipeline without shutting down or draining the line, would be the opposite but similar means to remove a pig or other physical object from the line.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A branch fitting for providing access to the interior of a pipe comprising:
    a body portion defined in part by a semi-cylindrical surface adapted to sealably engage a pipe including means to secure the body portion to the pipe in pressure retaining relationship;
    a first cylindrical barrel portion extending from said body portion in the plane of the tubular axis of the pipe;
    a second cylindrical barrel portion extending from said body portion in the same plane;
    means within said first barrel portion for providing an opening in the pipe, the opening providing access between said second barrel portion and the interior of the pipe;
    an operating member positionable in said second barrel portion; and
    means of moving said operating member from said second barrel through the formed opening into the interior of the pipe.

2. A branch fitting according to claim 1 wherein said first barrel portion has a closed end wall having an axial opening therein and wherein said means of providing an opening in the pipe comprises:
    a tubular hole cutter rotatably positioned in said first barrel portion having a shaft extending therefrom, the shaft being sealably received in said end wall opening whereby rotation and longitudinal force may be applied by means exteriorly of the fitting to advance the tubular cutter through the pipe wall.

3. A branch fitting according to claim 1 wherein the internal diameters of the first and second barrel portions are at least equal the internal diameter of the pipe for which the fitting is dimensioned.

4. A branch fitting according to claim 1 wherein the internal diameter of the first barrel portion is at least equal the internal diameter of the pipe to which the fitting is dimensioned and wherein said means within said barrel portion of providing an opening in a pipe is dimensioned to provide an opening having a width substantially equal to the interior diameter of the pipe.

5. A branch fitting according to claim 1 in which the angle of the cylindrical axis of the first and second barrel portions relative to the tubular axis of the pipe to which the fitting is dimensioned is between 30° and 90° and wherein the angle between the cylindrical axis of the first and second barrel portions is between 30° and 120°.

6. A branch fitting according to claim 1 wherein the axii of said first and second tubular portions intersect at a point at or adjacent the pipe wall.

7. A branch fitting according to claim 4 wherein the internal diameter of the second barrel portion is also at least equal the internal diameter of the pipe to which the fitting is dimensioned and wherein said operating member positionable in said second barrel portion has at least a portion thereof of a diameter substantially equal to the interior diameter of the pipe whereby the operating member external surface sealably engages the interior circumference of the pipe when the operating member has been inserted through the formed opening into the interior of the pipe.

8. A branch fitting according to claim 1 wherein said operating member is a pipe plugging member.

9. A branch fitting according to claim 1 wherein said operating member is a pipeline pig.

10. A brach fitting according to claim 1 including a second body portion defined in part by a semicylindrical surface adapted to sealably engage the pipe, the body portions mating together to encompass a short length of pipe and including means to secure the body portions together about the pipe in pressure retaining relationship.

* * * * *